(12) United States Patent
Anderson

(10) Patent No.: US 11,836,319 B2
(45) Date of Patent: Dec. 5, 2023

(54) TOUCH-SENSING VIA EXCITATION OF A SURFACE WITH A WAVEFORM

(71) Applicant: University of Pittsburgh—Of the Commonwealth System of Higher Education, Pittsburgh, PA (US)

(72) Inventor: David A. Anderson, Denver, CO (US)

(73) Assignees: University of Pittsburgh—Of the Commonwealth System of Higher Education, Pittsburgh, PA (US); UPMC, Pittsburgh, PA (US)

( * ) Notice: Subject to any disclaimer, the term of this patent is extended or adjusted under 35 U.S.C. 154(b) by 0 days.

(21) Appl. No.: 17/631,805

(22) PCT Filed: Aug. 6, 2020

(86) PCT No.: PCT/US2020/045223
§ 371 (c)(1),
(2) Date: Jan. 31, 2022

(87) PCT Pub. No.: WO2021/026365
PCT Pub. Date: Feb. 11, 2021

(65) Prior Publication Data
US 2022/0276762 A1    Sep. 1, 2022

Related U.S. Application Data

(60) Provisional application No. 62/884,086, filed on Aug. 7, 2019.

(51) Int. Cl.
G06F 3/041    (2006.01)
G06F 3/043    (2006.01)

(52) U.S. Cl.
CPC .......... *G06F 3/04186* (2019.05); *G06F 3/043* (2013.01)

(58) Field of Classification Search
CPC ..... G06F 3/04186; G06F 3/043; G06F 3/0436
See application file for complete search history.

(56) References Cited

U.S. PATENT DOCUMENTS

| | | | | |
|---|---|---|---|---|
| 10,126,870 | B2* | 11/2018 | Schwartz | G06F 3/0418 |
| 10,768,746 | B1* | 9/2020 | Pant | G06F 3/044 |
| 2012/0229407 | A1* | 9/2012 | Harris | G06F 3/0433 345/173 |
| 2016/0085324 | A1* | 3/2016 | Schwarz | G06F 3/043 345/173 |
| 2017/0212635 | A1* | 7/2017 | Cordeiro | G06F 3/04182 |

OTHER PUBLICATIONS

Anderson et al., "Flat-panel loudspeaker simulation model with electromagnetic inertial exciters and enclosures," *Journal of the Audio Engineering Society* 65(9): 722-732, Sep. 2017.

(Continued)

*Primary Examiner* — Jonathan A Boyd
(74) *Attorney, Agent, or Firm* — Klarquist Sparkman, LLP

(57) ABSTRACT

Disclosed herein are systems, methods, and devices for sensing touch at a surface. Sensing touch can be achieved while decreasing the number of sensors at a surface as well as data and computation complexity, but maintaining accuracy. Such sensing touch can be achieved via applying excitation and detecting emission waveforms at a surface that are associated with touch at a surface.

20 Claims, 11 Drawing Sheets

(56) References Cited

OTHER PUBLICATIONS

Braun et al., "Acoustic tracking of hand activities on surfaces," In *Proceedings of the 2nd international Workshop on Sensor-based Activity Recognition and Interaction*, pp. 1-5, Jun. 2015.
Collective et al., "Makey Makey: improvising tangible and nature-based user interfaces," In *Proceedings of the Sixth International Conference on Tangible, Embedded and Embodied Interaction*, pp. 367-370, Feb. 2012.
Collins, "Active acoustic touch interface," *Electronics Letters* 45(20): 1055-1056, Sep. 2009.
Harrison et al., "Scratch input: creating large, inexpensive, unpowered and mobile finger input surfaces," In *Proceedings of the 21st annual ACM symposium on User Interface Software and Technology*, pp. 205-208, Oct. 2008.
Holman et al., "TactileTape: low-cost touch sensing on curved surfaces," In *Proceedings of the 24th Annual ACM Symposium Adjunct on User Interface Software and Technology*, pp. 17-18, Oct. 2011.
International Search Report and Written Opinion, dated Oct. 29, 2020, issued for International Patent Application No. PCT/US2020/045223, 8 pages.
Karatas et al., "Printing multi-key touch interfaces," In *Proceedings of the 2015 ACM International Joint Conference on Pervasive and Ubiquitous Computing*, pp. 169-179, Sep. 2015.
Liu et al., "Vibsense: Sensing touches on ubiquitous surfaces through vibration," In *2017 14th Annual IEEE International Conference on Sensing, Communication, and Networking (SECON)*, pp. 1-9. IEEE, Jun. 2017.
Ono et al., "Sensing touch force using active acoustic sensing," In *Proceedings of the Ninth International Conference on Tangible, Embedded, and Embodied Interaction*, pp. 355-358, Jan. 2015.
Ono et al., "Touch & Activate: adding interactivity to existing objects using active acoustic sensing," In *Proceedings of the 26th annual ACM symposium on User Interface Software and Technology*, pp. 31-40, Oct. 2013.
Rosenberg et al., "The UnMousePad: an interpolating multi-touch force-sensing input pad," In *ACM SIGGRAPH 2009 Papers*, pp. 1-9, Jul. 2009.
Tung et al., "Expansion of human-phone interface by sensing structure-borne sound propagation," In *Proceedings of the 14th Annual International Conference on Mobile Systems, Applications, and Services*, pp. 277-289, Jun. 2016.
Xiao et al., "Toffee: enabling ad hoc, around-device interaction with acoustic time-of-arrival correlation," In *Proceedings of the 16th International Conference on Human-Computer Interaction with Mobile Devices & Services*, pp. 67-76, Sep. 2014.
Zhang et al., "Electrick: Low-cost touch sensing using electric field tomography," In *Proceedings of the 2017 CHI Conference on Human Factors in Computing Systems*, pp. 1-14, May 2017.

* cited by examiner

TOUCH-SENSING VIA EXCITATION OF A SURFACE WITH A WAVEFORM

CROSS REFERENCE TO RELATED APPLICATIONS

This is the U.S. National Stage of International Application No. PCT/US2020/045223, filed Aug. 6, 2020, which was published in English under PCT Article 21(2), which in turn claims the benefit of U.S. Provisional Application No. 62/884,086, filed Aug. 7, 2019. The provisional application is incorporated by reference herein in its entirety.

FIELD

The field relates to touch-sensing technologies implemented via excitation of a surface with a waveform.

BACKGROUND

Touch-sensing surfaces and methods are a fundamental problem faced by human-machine interface systems. Although a number of techniques have been developed to increase efficiency or decrease expense and space, there remains room for improvement.

SUMMARY

The Summary is provided to introduce a selection of concepts in a simplified form that are further described below in the Detailed Description. The Summary is not intended to identify key features or essential features of the claimed subject matter, nor is it intended to be used to limit the scope of the claimed subject matter.

In one embodiment, a touch-sensing system comprises at least one surface; at least one exciter, wherein the exciter is coupled to the surface, and applies an excitation waveform to the surface; at least one sensor, wherein the sensor is coupled to the surface, and detects an emission waveform at the surface; at least one processor, wherein the at least one processor is coupled to the at least one sensor; and memory, wherein the memory comprises computer-executable instructions capable of causing the one or more processors to perform a process comprising receiving a digital representation of the emission waveform from the at least one sensor; determining the presence of a touch, location of a touch, or the amount of pressure of a touch at the surface based on the digital representation of the emission waveform; and outputting the presence of a touch, location of a touch, or the amount of pressure of a touch at the surface.

In another embodiment, a method sensing touch at a surface comprises applying an excitation waveform to a surface by at least one exciter; detecting an emission waveform at the surface by at least one sensor; and determining the presence of a touch, location of a touch, or the amount of pressure of a touch at the surface based on the emission waveform; and outputting the presence of a touch, location of a touch, or the amount of pressure of a touch at the surface.

In another embodiment, a device for sensing touch at a surface comprises at least one surface; at least one exciter, wherein the exciter is coupled to the surface, and applies an excitation waveform to the surface; at least one sensor, wherein the sensor is coupled to the surface, and detects an emission waveform at the surface; in at least one computer-readable media, at least one trained classifier, one or more extracted features of emission waveforms associated with the presence of a touch, location of a touch, or an amount of pressure of a touch at the surface; and a touch identifier, configured to receive information for an emission waveform from the at least one sensor; determine the presence of a touch, location of a touch, or the amount of pressure of a touch at the surface based on the emission waveform; and output whether a touch is present, the location of a touch, or the amount of pressure of a touch at the surface.

In a further embodiment, one or more computer-readable media having encoded thereon computer-executable instructions that, when executed, cause a computing system to perform a method of sensing touch at a surface comprise receiving information for an emission waveform from at least one sensor; determining the presence of a touch, location of a touch, or the amount of pressure of a touch at the surface based on the emission waveform; and outputting the presence of a touch, location of a touch, or the amount of pressure of a touch at the surface.

As described herein, a variety of other features and advantages can be incorporated into the technologies as desired.

BRIEF DESCRIPTION OF THE DRAWINGS

In FIG. 6B, four pressure locations with 2 pressure magnitudes at each location as well as a free plate with no applied pressure are shown.

DETAILED DESCRIPTION

Example 1—Example Overview

Figure 1:
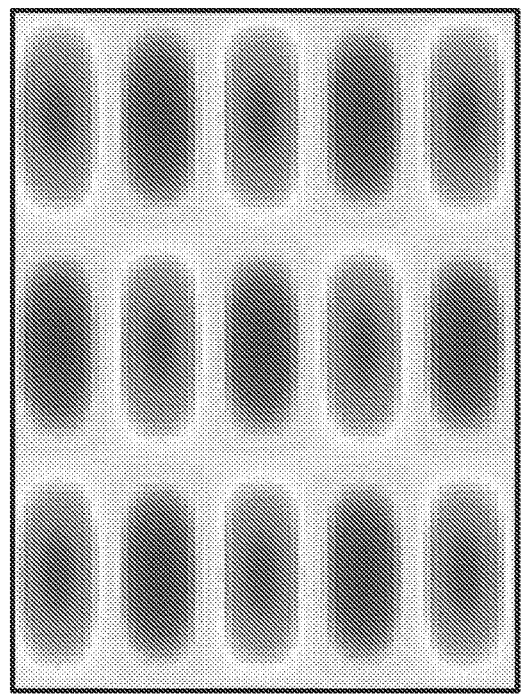
FIG. 1 shows two example mode shapes of a simply supported panel: the (1, 1) mode and the (3, 5) mode.
Figure 1:
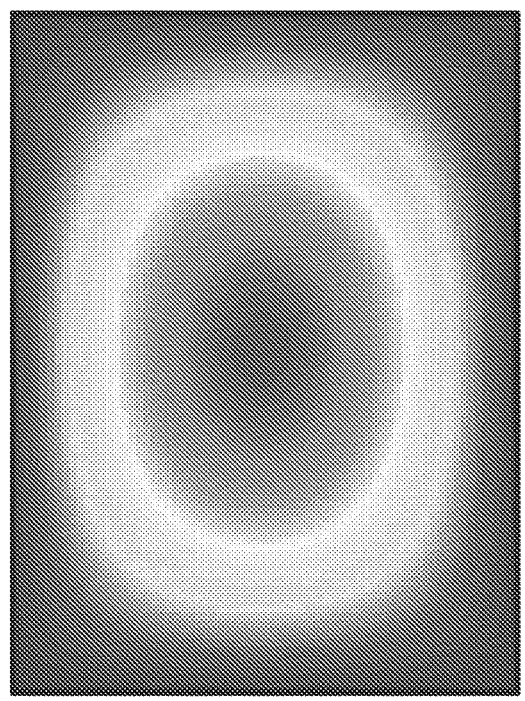

A variety of surfaces and waveforms can be used that implement touch-sensing surfaces. The resulting touch-sensing surfaces can be used for human-machine interfacing. Touch-sensing surface implementations using such surfaces and waveforms can approach or maintain a level of accuracy observed in conventional approaches while reducing the amount of equipment needed as well as the overall computing power.

Example 2—Example System Implementing Touch-Sensing Via Excitation of a Surface with a Low Frequency Waveform Example systems for implementing touch-sensing via excitation of a surface with a waveform are disclosed herein.

Example systems can include training and use of touch-sensing surfaces. In practice, touch-sensing surfaces can be trained or used independently or in tandem. For example, a system can be trained and then deployed to be used independent of any training activity, or the system can continue to be trained after deployment. Example systems can include at least one surface, at least one exciter, at least one sensor, and at least one processor.

In example systems, an exciter can be coupled to a surface and apply a waveform, or an excitation waveform (such as a low-frequency waveform), to the surface. In practice, a surface is excited by a waveform, generating an excited surface, which can include a structural vibration of the surface. A structural vibration of the surface can have inherent resonance properties. However, perturbation of a structural vibration of a surface, for example, via a touch on the excited surface, can alter resonance properties of an excited surface.

Example systems can include a sensor coupled to a surface that can receive an emission waveform from the surface. In practice, a waveform emitted from a surface depends on the resonant properties of the surface. In examples, the resonant properties of a surface are altered with the presence of a touch. For example, an emission waveform generated by a surface without the presence of a touch can measurably differ from emission waveforms generated by a surface with the presence of a touch. In examples, emission waveforms generated by a surface with the presence of a touch in different locations at the surface, with different levels of pressure, or both can also measurably differ from one another. An excited surface can transmit such emission waveforms to a sensor. Further, in example systems, a sensor that can receive an emission waveform from a surface can include a sensor capable of converting mechanical energy into electrical energy, such as a piezoelectric, moving coil exciter, or magnetostrictive sensor.

Example systems can include a processor coupled to a sensor and memory, such as memory with computer-executable instructions for a touch identifier. In practice, a processor can receive a signal, such as an electrical signal, from the sensor that detects waveforms, such as emission waveforms. In examples, a processor can use emission waveforms (such as through a digital representation of the waveform; because the digital representation of the waveform represents the waveform, it is sometimes simply called the "waveform" herein) to determine the presence of a touch, location of a touch, or the amount of pressure of a touch at the surface or any combination thereof. For example, a classifier or classifier model can be used. A processor can then provide an output of the determined presence of a touch, location of a touch, or the amount of pressure of a touch at the surface or any combination thereof.

In example systems, the processor or memory can include executable instructions for training a touch-sensing surface. In practice, a touch-sensing surface can be trained using machine learning, such as using machine learning to train a classifier or generate a classifier model. Multiple types of machine learning are possible.

In any of the example systems herein, multiple configurations of the at least one surface, at least one exciter, at least one sensor, and at least one processor are possible. For example, example systems can include at least 1, at least 2, at least 3, at least 4, at least 5, at least 10, at least 20, at least 50, or at least 100 surfaces, exciters, sensors, or processors in various combinations. For example, a single surface can be coupled to multiple exciters and/or multiple sensors, or a single surface can be coupled to a single exciter and a single sensor. In examples, elements of a system can also be coupled to at least one processor in varying combinations. For example, systems can include processors coupled with only sensors, or example systems can include processors coupled with sensors and exciters.

In practice, the systems disclosed herein can vary in complexity with additional functionality, more complex components, and the like. The described systems can also be networked via wired or wireless network connections to a global computer network (e.g., the Internet). Alternatively, systems can be connected through an intranet connection (e.g., in a corporate environment, government environment, educational environment, research environment, or the like).

The systems disclosed herein can be implemented in conjunction with any of the hardware components described herein, such as computing systems described below (e.g., processing units, memory, and the like). In any of the examples herein, the inputs, outputs, digital representations of waveforms (such as excitation and emission waveforms), extracted features, trained classifiers, classifier models, information about touch (such as touch presence, locations, and pressures), and the like can be stored in one or more computer-readable storage media or computer-readable storage devices. The technologies described herein can be generic to the specifics of operating systems or hardware and can be applied in any variety of environments to take advantage of the described features.

Example 3—Example Method Implementing Touch-Sensing Via Excitation of a Surface with a Low Frequency Waveform Example methods implementing touch-sensing via excitation of a surface with a waveform are disclosed herein.

Example methods include both training and use of touch-sensing surfaces. However, in practice, either phase of the technology can be used independently (e.g., a touch-sensing surface can be trained and then deployed to be used independently of any training activity) or in tandem (e.g., training continues after deployment).

In example methods, a waveform (such as an excitation waveform) can be applied (for example, by at least one exciter) to a surface, such as a touch-sensing surface. In practice, an excitation waveform can be a low-frequency waveform, a waveform with even and odd harmonics, or both. For example, an excitation waveform can then excite a touch-sensing surface, which can generate a structural vibration of the surface with inherent resonant properties.

Example methods can include detecting resonant properties of an excited surface. In practice, an excited surface can produce a waveform, such as an emission waveform, which can then be detected (for example, by at least one sensor). Emission waveforms can measurably differ depending on whether or not a touch at the surface is present (such as via pressure from a touch applied at the surface). Emission waveforms can also measurably differ depending on the location of a touch at the surface (such as via the location of pressure from a touch applied at the surface), different levels of touch pressure, or both.

In example methods, a detected emission waveform can be used to determine presence of a touch, location of a touch, or an amount of pressure of a touch at a surface. In practice, a classifier or classifier model can be used (such as a nearest neighbors classifier) to extract features from a detected waveform (such as a digital representation thereof) and compare the extracted waveform features to waveform features of known surface configurations. Examples of known surface configurations can include surfaces with no touch present, surfaces with a touch present, surfaces with a touch in a known location, surfaces with a touch with a known pressure, or surfaces with a touch in a known location and a known pressure.

In example methods, the determined presence of a touch, location of a touch, or the amount of pressure of a touch at a surface can be output. Multiple output options are possible. Examples can include outputting to a processor for further processing. Examples of further processing include training a classifier or classifier model or applications that use human-machine interface, for example, service or financial transaction applications, scientific applications, communication applications, games, and travel applications.

Example methods can further include training surfaces to determine presence of a touch, location of a touch, or an amount of pressure of a touch. For example, training a surface can include providing waveform information associated with presence of a touch, location of a touch, or an amount of pressure of a touch at a surface to a processor. In practice, training can include using machine learning, such as using machine learning to train a classifier or classifier or classifier model. Multiple types of machine learning are possible.

Other steps are possible. For example, additional steps can precede applying a waveform (such as using an exciter). In examples, a waveform can be generated (such as using a function generator), modified (such as by a power modifier, for example, a voltage divider or an amplifier), or both before it is applied. In examples, a waveform can be modified after detection by a sensor (for example, prior to processing or receipt by a processor), such as modification of power (for example, by an amplifier or preamplifier) or form (for example, an analog-to-digital convertor, or ADC).

Example 4—Example Waveforms

In any of the examples herein, a waveform can include a variety of features and parameters. In practice, a waveform can be an excitation waveform (such as a waveform applied by an exciter) or an emission waveform (such as waveform detected by a sensor). For example, an excitation waveform can be applied to a surface by at least one exciter, or an emission waveform can be detected at a surface by at least one sensor. Waveforms can also be represented digitally and features extracted therefrom.

Example waveforms can include a variety of frequencies. For example, waveforms can include low frequencies, such as about 10 Hz-1 kHz. In examples, waveforms can include frequencies at least about 10 Hz, at least about 20 Hz, at least about 50 Hz, at least about 100 Hz, at least about 200 Hz, at least about 300 Hz, at least about 400 Hz, at least about 500 Hz, or at least about 1 kHz, or about 10-20 Hz, about 10-50 Hz, about 10-100 Hz, about 100-200 Hz, about 100-500 Hz, or about 100 Hz-1 kHz, or about 100-200 Hz, 125 Hz, or 143 Hz.

In practice, user interaction may be a consideration in selecting waveform frequency. For example, a maximum frequency may be selected that reduces or eliminates any haptic or auditory perception of the frequency by a user. For example, the maximum frequency may generate a surface vibration with a displacement of at least about 0.5, 0.75, 1, 1.5, or 2 microns; about 0.5-1, 0.5-1.5, or 0.5-2 microns; or about 1 micron. A variety of factors can be modulated to comply with a frequency maximum, such as electrical amplitude of the waveform, surface size, exciter type, and surface or exciter material. In specific, non-limiting examples, a piezoelectric exciter on a steel panel may need 10 volts to produce 1 micron of displacement, while a moving-coil exciter on an acrylic panel may only need 20 mvolts to produce 1 micron of displacement.

Waveforms can include other features or parameters. Examples of features or parameters include amplitudes or magnitudes thereof.

Example 5—Example Surfaces

In any of the examples herein, a surface (such as a touch-sensing surface) can take a variety of forms. Examples herein can be used to train a classifier at the surface, for example, to aid in determining the presence of a touch, location of a touch, or the amount of pressure of a touch at the surface. Thus, in practice, a surface can include a variety of shapes and materials, which can be trained to sense touch using examples herein.

In practice, the surface shape is arbitrary. Therefore, the surface shape can take a variety of forms, such as a square, rectangular, curved, circular, oval, or spherical surface. Examples of materials include plastic (such as acrylic or polymer(s) included on a display screen, for example, on a monitor, smartboard/interactive whiteboard, or mobile device), metal, wood, composite paperboard or foamboard (such as GATORFOAM® material), glass (such as on a window, on a display screen, for example, on a monitor, smartboard/interactive whiteboard, or mobile device), or architectural panels (such as drywall).

In examples, a surface can be coupled with one or more elements that aid in touch-sensing. In practice, a surface can be coupled with at least one exciter, at least one sensor, or both. Other elements are possible, such as at least one support for the surface or surface and other elements of the examples herein.

A surface can be coupled with one or more elements in a variety of configurations. In examples, a surface can be coupled to at least one exciter and at least one sensor. In practice, relative positioning of an exciter and sensor to each other and to the surface is arbitrary and does not depend on surface shape (for example, square, rectangular, curved, circular, oval, or spherical surface can be used, in which an exciter and sensor are positioned in a variety of configurations). In specific non-limiting examples, the at least one exciter and at least one sensor are positioned opposite one another or at surface edges or corners, for example, on a square or rectangular surface.

In examples, a surface can be coupled to at least one support. A variety of support materials, shapes, and configurations can be used. Generally, surface corners, edges, or middle are glued or elastically restrained using a gasket, such as with smartphone screens. In examples, the support is a wood-based support, in which at least one wood block is placed under a surface, such as one, two, three, or four wood blocks.

In examples, a system can be used to identify or determine locations or positions at the surface. A variety of systems are possible. In practice, one or more numbers or symbols can be used to uniquely identify or determine locations or positions at the surface. For example, a coordinate system with 2 or more numbers representing a unique point position on a plane, such as a Cartesian coordinate system, cylindrical or spherical coordinate system, or a homogeneous coordinate system. Other coordinate systems are possible.

Example 6—Example Exciters

In any of the examples herein, at least one exciter can be included. An exciter applies a waveform (such as an excitation waveform) to a surface (such as a touch-sensing surface). In practice, an exciter can take a variety of forms and configurations, ranging from simple to complex, to apply a waveform to a surface.

Further, more than one exciter can be used, such as at least one, at least two, at least three, at least four, at least five, at least ten, at least fifty, or at least one hundred exciters can be used.

In examples, an exciter can be coupled to additional elements in order to apply a waveform or apply a waveform with a desired frequency, power, or amplitude. Examples of additional elements include elements for tuning the excitation waveform, such as a function generator, elements that modify waveform power (such as a voltage divider circuit or a power amplifier or both), or any combination thereof. Other elements are possible, such as a processor.

In examples, an exciter can be coupled to an amplifier. In practice, a variety of amplifiers can be used, for example, depending on the exciter that is used. Example amplifiers include a moving-coil amplifier or piezoelectric amplifier.

In examples, an exciter can be coupled to a frequency filter. A variety of filters can be used to select to frequencies or a range of frequencies. For example, filters can include low-pass, band-pass, notch, or high-pass filters.

In examples, an exciter can be used that applies a waveform of low frequency (such as 100-200 Hz), even and odd harmonics (such as a sawtooth waveform), or both to a surface.

Example 7—Example Sensors

In any of the examples herein, a sensor can be included. A sensor can detect a waveform (such as an emission waveform) at a surface (such as a touch-sensing surface). In practice, a sensor can take a variety of forms and configurations, ranging from simple to complex to detect a waveform at a surface.

More than one sensor is possible. Examples herein can include at least one, at least two, at least three, at least four, at least five, at least ten, at least fifty, or at least one hundred exciters can be used. In specific, non-limiting examples, only one sensor is included.

In examples, a sensor can be coupled to additional elements in order to detect a waveform or detect and provide the waveform with a desired frequency, power, or amplitude for further processing. Examples of additional elements include a processor, elements that modify waveform power or form, or any combination thereof.

In examples, a sensor can be used to detect a waveform of low frequency (such as 100-200 Hz), even and odd harmonics (such as a sawtooth waveform), or both at a surface. In practice, a sensor can detect a waveform by converting mechanical energy into electrical energy (such as a piezoelectric sensor).

Further, a sensor can be coupled to additional elements, such as an amplifier (such as a preamplifier), an analog-to-digital converter (ADC), and a processor, in order to detect a waveform to a surface or detect and provide a waveform (or digital representation thereof) for further processing.

In examples, a sensor can be coupled to a frequency filter. A variety of filters can be used to select to frequencies or a range of frequencies. For example, filters can include low-pass, band-pass, notch, or high-pass filters.

Example 8—Example Implementation of Determining Touch at a Surface

Any of the methods described herein can include determining touch at a surface, such as determining the presence, location, or pressure of a touch at a surface. In practice, a waveform, such as emission waveforms described herein, can be used for determination.

In examples, determining touch can include receiving a waveform (such as an emission waveform or digital representation thereof, for example, from at least one sensor). In practice, a variety of steps can occur after a waveform (or digital representation thereof) is received, such as preprocessing steps.

In examples, preprocessing steps can include transformation of a waveform, feature extraction (such as from a waveform, a transformed waveform, or a digital representation thereof) or normalization (such as of a waveform or features extracted therefrom). In practice, transformation of a waveform (or a digital representation thereof) can include a time-frequency analysis, such as a Fourier transformation or variation thereof, such a fast Fourier transform.

In examples, preprocessing steps can also include feature extraction, such as extraction of waveform amplitudes (or magnitudes thereof). In specific examples, amplitudes of waveform harmonics or phases or waveform harmonics can be extracted.

In examples, preprocessing can include transforming a waveform (or a digital representation thereof), such as using a Fourier transform (for example, fast Fourier transform), into a frequency domain representation. In examples, feature extraction can then be performed on a transformed waveform, such as extracting amplitudes, for example, for further processing.

In examples, after receiving a waveform (or a digital representation thereof) and after any preprocessing steps, determining a touch can include providing a waveform or features extracted from a waveform (or a digital representation thereof) to a processor for touch identification ("touch identifier"). In practice, a touch identifier can include one or more databases, classifiers, classifier models, or a combination thereof.

In examples, databases can include waveforms (or a digital representation thereof) or waveform features associated with touch information, such as waveform (for example, of a transformed waveform) amplitudes or phases (such as harmonic amplitudes or phases) associated with presence of a touch, touch location, touch pressure, or a combination thereof.

In example, classifiers or classifier models can include machine learning models, such as using artificial neural networks, nearest neighbors, or a combination thereof. In practice, classifiers or classifier models, such as nearest neighbors (for example, K nearest neighbors) or artificial networks (such as deep neural network), can be used to classify a waveform (such as an emission waveform or a transformed waveform) or features extracted therefrom (such as amplitudes).

In examples, nearest neighbors can be used to classify a waveform (such as an emission waveform or a transformed waveform) or features extracted therefrom (such as amplitudes). In practice, nearest neighbors can match a waveform or features extracted therefrom (such as a query waveform) to waveforms or features extracted therefrom associated with touch at a surface (such as associated with touch presence, location, or pressure).

The touch determination can then be output, such as the presence of a touch, location of a touch, or the amount of pressure of a touch at the surface or a combination thereof. In practice, the output can include the presence, location, or pressure of a touch at a surface. The output can stand alone or be used in connection with other applications, such as applications that use human-machine interface, for example, service or financial transaction application, communication applications, games, and travel applications.

Example 9—Machine Learning

In any of the examples herein, machine learning can be used to train a classifier or classifier model. Machine learning includes automated identification of patterns in data (such as waveform data, digital representations thereof, or features extracted therefrom). Machine learning can be supervised or unsupervised. Examples of machine learning can include nearest neighbors, random forest, support vector machines, and artificial neural networks.

In examples, nearest neighbors, such as K nearest neighbors (KNN), is used for machine learning. In practice, KNN can be trained by providing training examples as input (such as example waveform data, digital representations thereof, or features extracted therefrom associated with touch, such as touch presence, pressure, or known location). KNN can then store the training examples with a class labeled in a feature space, thus, generating a trained KNN.

In practice, a variety of KNN configurations can be used. For example, a variety of values can be used for K or the number of neighbors used for comparison in order to make a classification. For example, the values for K or the number of neighbors can be at least 1, 2, 3, 4, 5, 7, 10, 15, 30, 50, 100, or more; 1-5, 1-10, 1-20, 5-10, or 50-100; or about 5.

In practice, when a query (such as a query waveform data, digital representations thereof, or features extracted therefrom) is input, a trained KNN can classify the query based on the proximity of the query to training examples in feature space (such as using a distance function or metric, for example, a Euclidean or Hamming distance). Thus, a greater number of training examples generated more accurate classification.

In examples, artificial neural networks, such as deep neural networks, or DNN) can be used for machine learning. In ANN (such as DNN), training data (such as waveform data, digital representations thereof, or feature extracted therefrom) input and processed using multiple layers (or nodes), which consider various characteristics of the training data. A trained ANN is generated by assigning weights between layers based on the characteristics of the training data, thus, generating a trained ANN (such as a trained DNN).

In practice, a trained ANN can be generated that classifies a query (such as query waveform data, digital representations thereof, or features extracted therefrom) is input, a trained KNN can classify the query that can classify input based on the characteristics of the input. Thus, a greater number of training examples generated more accurate classification.

Example 10—Example Receiving an Emission Waveform

In any of the examples herein, emission waveforms (or digital representations thereof) can be received, such as by a processor. In practice, receiving can include various processing steps before, after, or with receipt of an emission waveform (or a digital representation thereof).

For example, processing can include selecting a frame length, selecting a sample collection rate, selecting an amount of time for sample collection, and interfacing with a sensor (such as initiating receiving emission waveforms or digital representations thereof from a sensor or ending receiving emission waveforms or digital representations thereof from a sensor).

Example 11—Example Transforming an Emission Waveform

In any of the examples herein, emission waveforms (or digital representations thereof) can be transformed. In practice, various processing steps can be used for transformation.

In practice, transformation can be used for training a classifier or classifier model. For example, transformation can include a time-frequency transformation (such as a Fourier transformation or variation thereof, such a fast Fourier transform), apodization (or windowing, such as Blackman windowing), and identifying harmonics of a waveform (such as using time-frequency transformed waveforms). Other processing is possible, such as extracting features of waveforms (or digital representations thereof, such as amplitudes, for example, amplitudes of a waveform's harmonics), normalization of waveforms (or digital representations thereof, such as using time-frequency transformed waveforms) or log transformation of the waveform, digital representation thereof, or features extracted therefrom (for example, log transformation of amplitudes from waveform data or transformed waveforms).

Output from transforming an emission waveform (or digital representation thereof) can include a transformed waveform or features extracted therefrom (such as amplitudes of a transformed waveform). In practice, output can include more than one transformed waveform or features extracted therefrom, such as in an array (for example, an array of transformed waveform amplitudes).

In practice, transformation can be used for transforming a query waveform (or digital representations thereof). In practice, transformation can include a time-frequency transformation (such as a Fourier transformation or variation thereof, such a fast Fourier transform) and apodization (or windowing, such as Blackman windowing). Other processing is possible, such as extracting features of waveforms (or digital representations thereof, such as amplitudes, for example, amplitudes of a waveform's harmonics) or log transformation of the waveform or features extracted therefrom (for example, log transformation of amplitudes from the waveform, digital representations thereof, or transformed waveform).

Output from transforming an emission waveform (or digital representation thereof) can include a transformed waveform or features extracted therefrom (such as harmonic amplitudes of a transformed waveform). In practice, output can include more than one transformed waveform or features extracted therefrom, such as in an array (for example, an array of transformed waveform amplitudes).

Example 12—Example Training a Classifier or Classifier Model

Examples of training a classifier or classifier models are disclosed herein. Classifiers or classifier models can be trained in multiple ways. In examples, machine learning can be used for training, such as supervised or unsupervised machine learning.

Examples of classifiers or classifier models that can be used include logistic regression, naïve Bayes, stochastic gradient descent, K nearest neighbors (KNN), decision tree, random forest, and support vector machine. Examples of training include using training a K nearest neighbors classifier or using artificial neural networks (such as deep neural networks, or DNN), for example to produce a classifier model. In specific, non-limiting examples, KNN can be used. In practice, a variety of KNN configurations can be used. For example, a variety of values can be used for K or the number of neighbors used for comparison in order to make a classification. For example, the values for K or the number of neighbors used for comparison in order to make a classification can be at least 1, 2, 3, 4, 5, 7, 10, 15, 30, 50, 100, or more; 1-5, 1-10, 1-20, 5-10, or 50-100; or about 5.

In examples of training a classifier or classifier model, machine learning with training data can be used. In practice, training data can be collected a variety of ways. For example, data collected can include whether a touch is present, the coordinates of a location of a touch, an amount of pressure of a touch, or an associated emission wavelength of a touch at a surface or any combination thereof. Thus, examples of training a classifier can include receiving collected data (such as emission waveform data associated with the surface without the presence of a touch, and a plurality of emission waveform data associated with the presence of a touch, location of a touch, or the amount of pressure of a touch at the surface).

Examples of training a classifier or a classifier model can also include performing machine learning (such as using KNN or DNN) using collected data. In practice, performing machine learning can include extracting features of collected data, such as emission waveform data, for example, emission waveform data associated with the presence of a touch, location of a touch, or the amount of pressure of a touch at the surface. In examples, extracted features include amplitudes or phases of emission waveforms (such as magnitudes of emission waveform amplitudes), for example, the amplitudes or phases of emission waveform harmonics. Further, performing machine learning can also include identifying a classifier model, such as a classifier model that is based on features extracted from collected data, for example, emission waveform data associated with the presence of a touch, location of a touch, or the amount of pressure of a touch at the surface. Thus, a trained classifier or classifier model can then be output.

A trained classifier or classifier model (such as KNN) can then be used to classify a touch at a surface. In examples, a classifier or classifier model trained using emission waveform data associated with no touch at a surface or a touch at a surface can be used to determine whether or not a touch is present at a surface based on emission waveform data. Further, a classifier trained using emission waveform data associated with a pressure, a location, or both of a touch at a surface can be used to determine the pressure, the location, or both of a touch at a surface based on emission waveform data.

In examples of training a classifier, a variety of steps and arrangements thereof are possible. In practice, training a classifier can include both training steps and validation steps, for example, using collected data (such as emission waveform data, for example, emission waveform amplitudes or magnitudes thereof, such as associated with presence, pressure, or location of a touch at a surface).

In examples, training can include defining data collected, for example, number of data (for example, number of emission waveform data, such as associated with presence, pressure, or location of a touch at a surface) or how data are used (such as data used for training, for example, training KNN, or data used for validation of a trained classifier or classifier model, for example, trained KNN). In examples, data used for training or validation can also be defined, such as relative amount of training and validation of data collected, for example, about 50%/50%, 60%/40%, 70%/30%, 80%/20%, or 90%/10% training/validation data of data collected; other ratios of training and validation data are possible. In examples, the data points collected in training or validation can related to the value of K or the number of neighbors used for comparison in order to make a classification, such as at least about 2-fold, 3-fold, 4-fold, 5-fold, 10-fold, or 100-fold greater than the value of K or the number of neighbors used for comparison in order to make a classification.

In examples, training can include aggregating data, such as data collected (for example, training or validation data). In practice, aggregating data can include aggregating data in one or more arrays, such as aggregating data for training in one or more arrays or aggregating data for validation in one or more arrays. Arrangements of aggregated data can vary, for example, data can be random or orderly (such as data randomized in an array). Additional information can be aggregated (such as in an array), for example, data labels or associated data (such as presence, pressure, or location of a touch at a surface).

Examples of training a classifier or classifier model can include outputting a trained classifier or classifier model. In practice, outputting can include creating a model array based on the trained classifier or classifier model, for example, a model KNN array. Additional outputs are possible. For example, a structure of a trained array (such as a KNN array) can be output, such as for additional training in the future. In examples, a validated, trained classifier or classifier model can be output, for example, as a confusion matrix.

Example 13—Example Implementation of Sensing Touch at a Surface

In any of the examples herein, sensing touch at a surface can include various steps. In practice, steps can include selecting parameters for sensing touch at a surface.

For example, parameters can include number of data points (which can also be referred to as frame length) for waveform collection. In examples, number of data points can be set as the apodization (or Blackman) window. In examples, number of data points can In specific, non-limiting examples, number of data points can be at least about 8, 15, 16, 32, 64, 128, 256, 512, or 1024; about 8-32, 32-128, 128-512, or 8-1024, or 128-512; or about 15 or 512.

In examples, parameters can include sampling rate. In practice, a variety of sampling rates can be used. For example, sampling rates can include at least about 800 Hz, 900 Hz, 1 kHz, 2 kHz, 4 kHz, 6 kHz, 8 kHz. 10 kHz, 20 kHz, 50 kHz, 100 kHz, or more; or 800 Hz-8 kHz, 800 Hz-10 kHz, 800 Hz-100 kHz, or 6 kHz-10 kHz; or about 8 kHz.

In examples, parameters can include the location of harmonics in waveforms (such as transformed waveforms, for example, using time-to-frequency analysis, such as Fourier transformation or fast Fourier transformation). In practice, harmonics can be located theoretically or empirically.

In examples, parameters can include, amount of time for collecting waveforms, which can vary. In specific, non-limiting examples, query waveforms (or waveform data) are collected, and examples of amount of time for collecting waveforms can include at least about 100, 200, 500, 1000, 2000, or 5000 s, or about 100-1000 s, or about 1000 s). In specific, non-limiting examples, waveforms are collected for classifier or classifier model training, and examples of amount of time for collecting waveforms (or waveform data) can include at least about 10, 20, 30, 50, or 100 s, or about 10-50 s, or about 30 s, which can be further broken down into smaller subsets for indexing sets of data points (such as at least about 2, 5, 8, 10, 15, or 20 s, or about 2-15 s, or about 5 or 10 s).

In practice, steps can also include transforming waveforms (or digital representations thereof). For example, transformation can include normalization, apodization, time-to-frequency analysis, log transformation, and feature extraction (such as amplitudes, for example, harmonic amplitudes).

In practice, steps can include determining touch. For example, where query waveforms are collected, a trained classifier or classifier model can be used to determine touch, such as touch presence, pressure, or location.

In practice, steps can also include outputting. For example, output can include plotting transformed harmonic amplitudes of waveforms (such as in an array) or determined touch, such as touch presence, pressure, or location can be output.

Example 14—Example Device

In any of the examples herein, a device for sensing touch at a surface can take a variety of forms. In practice, a device can include at least one surface, such as surfaces disclosed herein.

In examples, a device can further include at least one exciter, such as exciters disclosed herein. In practice, an exciter can apply a waveform to a surface. In examples, an exciter may be coupled to a surface or a variety of other elements. For example, an exciter may be coupled with a processor, such as for automated control of an exciter, or elements for tuning or modifying an excitation waveform.

An exciter may be positioned in a variety of locations at the surface. In practice, positioning of an exciter at a surface is arbitrary and does not depend on surface shape (for example, square, rectangular, curved, circular, oval, or spherical surface can be used, in which an exciter is positioned in a variety of configurations). In specific non-limiting examples, an exciter is positioned opposite a sensor or at surface edges or corners, for example, on a square or rectangular surface.

In examples, a device can include at least one sensor, such as sensors disclosed herein. In practice, a sensor can detect an emission waveform at the surface. In examples, a sensor may be coupled to a variety of other elements. For example, a sensor may be coupled with a processor, such as for automated control of a sensor, or elements for tuning or modifying an emission waveform.

A sensor may be positioned in a variety of locations at the surface. In practice, positioning of a sensor at a surface is arbitrary and does not depend on surface shape (for example, square, rectangular, curved, circular, oval, or spherical surface can be used, in which a sensor is positioned in a variety of configurations). In specific non-limiting examples, a sensor is positioned opposite an exciter or at surface edges or corners, for example, on a square or rectangular surface.

In examples, a device can include at least one computer-readable media. In practice, computer-readable media can include at least one trained classifier and extracted features of emission waveforms associated with the presence of a touch, location of a touch, or an amount of pressure of a touch at the surface. In examples, computer-readable media can also include a touch identifier, configured to receive information for an emission waveform from at least one sensor (for example, as described herein); determine the presence of a touch, location of a touch, or the amount of pressure of a touch at the surface based on the emission waveform (for example, as described herein, such as using a classifier or classifier model, such K nearest neighbors, KNN); and output whether a touch is present, the location of a touch, or the amount of pressure of a touch at the surface. Other configurations are possible.

Example 15—Example Implementation

The vibration of thin plates, such as those that can be used as a touch-sensitive surfaces, can be considered as a superposition of modal functions, each with their own excursion profiles and time- or frequency-dependent behavior. For example, the lowest "mode" of a simply supported thin plate is a bowing out of the panel with the largest excursion at the center of the plate and lesser excursion towards the edges of the panel, representing a half-wavelength of a sinusoidal function in each dimension of the plate. Higher order modes have greater multiples of half wavelengths in each dimension of the plate and a correspondingly higher resonant frequency. The displacement profiles of two example modes are shown in FIG. 1.

The application of an external pressure distribution (such as pressing on the plate with their finger) causes the resonant properties of the panel to change, both in the modal displacement profiles and their resonant frequencies. However, the shifts do not need be known analytically and can be determined empirically. A machine-learning-based classification system can be used to classify the user input based on resonances; thus, this example method is generalizable to irregularly shaped or even curved surfaces that transmit acoustic vibration.

The K-nearest-neighbors (KNN) algorithm is a machine-learning-based classification system based on measuring a test data point's distance away from labeled data points and labeling the test data with the same classification as the points nearby. A KNN algorithm uses a predefined feature set, which are numerical measurements selected by an algorithm designer to classify data.

In this example, the exciter produced a low-frequency waveform that includes both even and odd harmonics, such as a sawtooth wave, and this waveform was distorted by the vibroacoustic behavior of the panel as well as any applied pressure. Because the waveform was altered in a highly variable manner depending on the location and magnitude of the pressure applied to the panel, a machine learning algorithm can be trained to classify the nature of the applied pressure.

In this example, a small acrylic panel was used to classify pressure magnitudes and locations based on the harmonic amplitudes generated from the FFT of a 512-point frame of the signal produced by an piezoelectric sensor. In the first example implementation, 5 locations on the panel and 2 pressure magnitudes were classified, producing perfect results using 90 data points per location and magnitude and a 5-NN classifier. The second example implementation, which used a total of 58 panel locations, 60 data points per location, and only a weight of 100 g, produced only 3 errors in the validation dataset classification. This example demonstrates that the method can be extended to a higher density of panel points and pressure magnitudes as well as additional panel materials and shapes.

Example Implementation Set-Up

Figure 2:
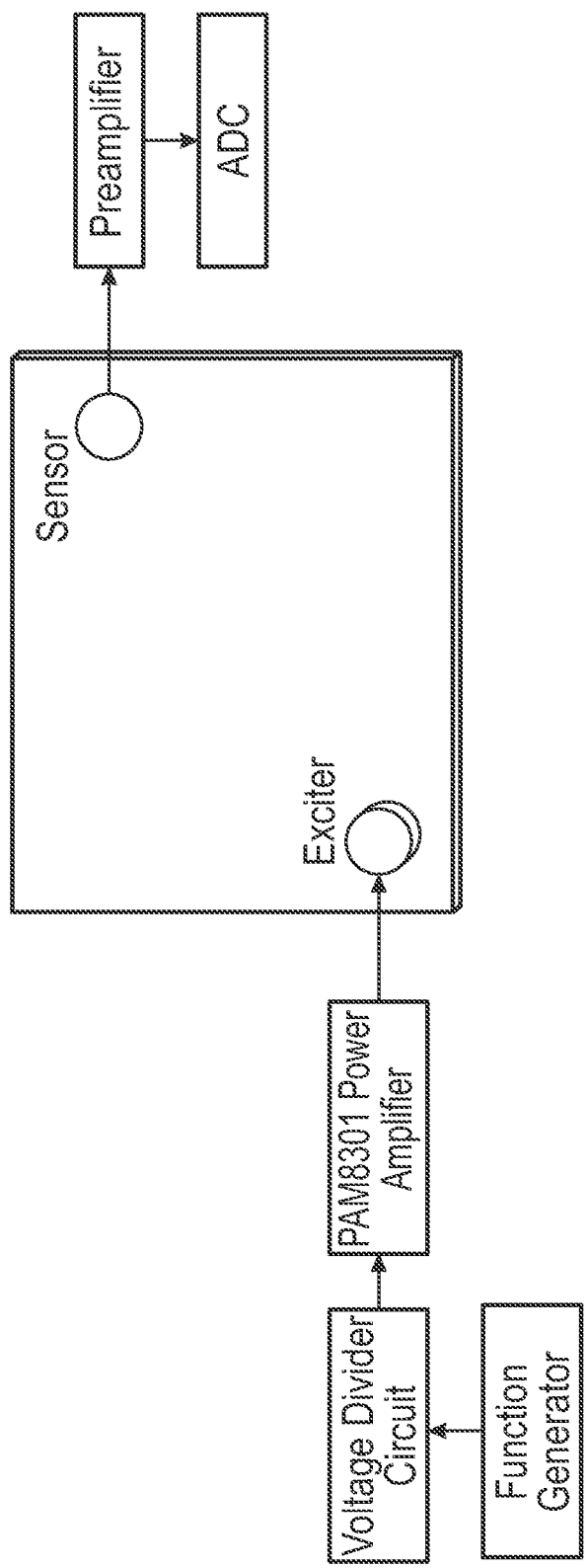
FIG. 2 shows an example block diagram of an example implementation setup: a function generator sends a sawtooth wave to the exciter, which excites the plate into vibration. The sensor then picks up the signal and sends it to the preamplifier and ADC.
Figure 3:
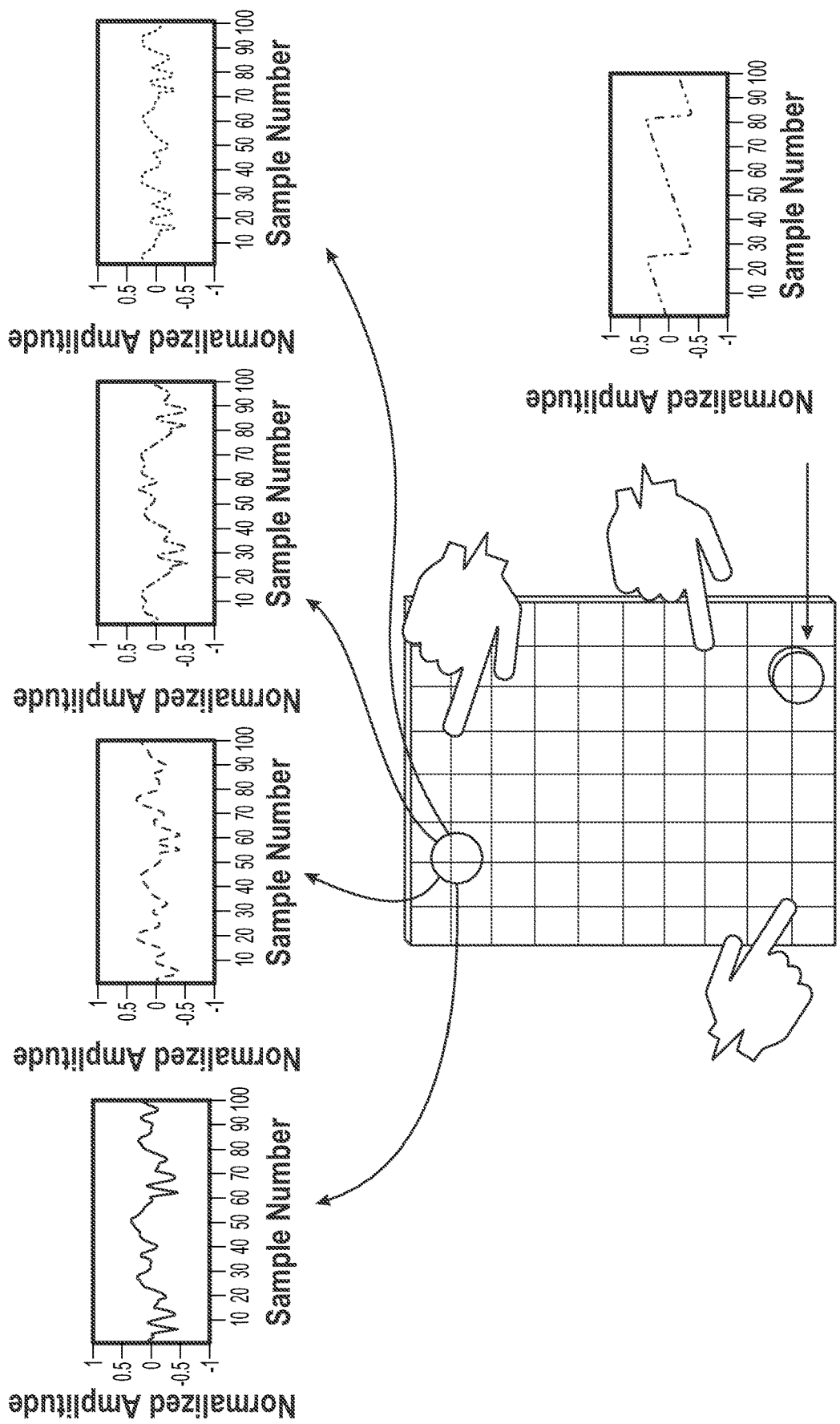
FIG. 3 shows an example illustration of the device (referred to as pressure and location-based acoustic sensing touch interface using classification or the acronym "PLASTIC"): a signal generator sends a sawtooth wave to the exciter, which excites the plate into vibration. The sensor then picks up the signal, which changes depending on the location and magnitude of the applied pressure.
Figure 4:
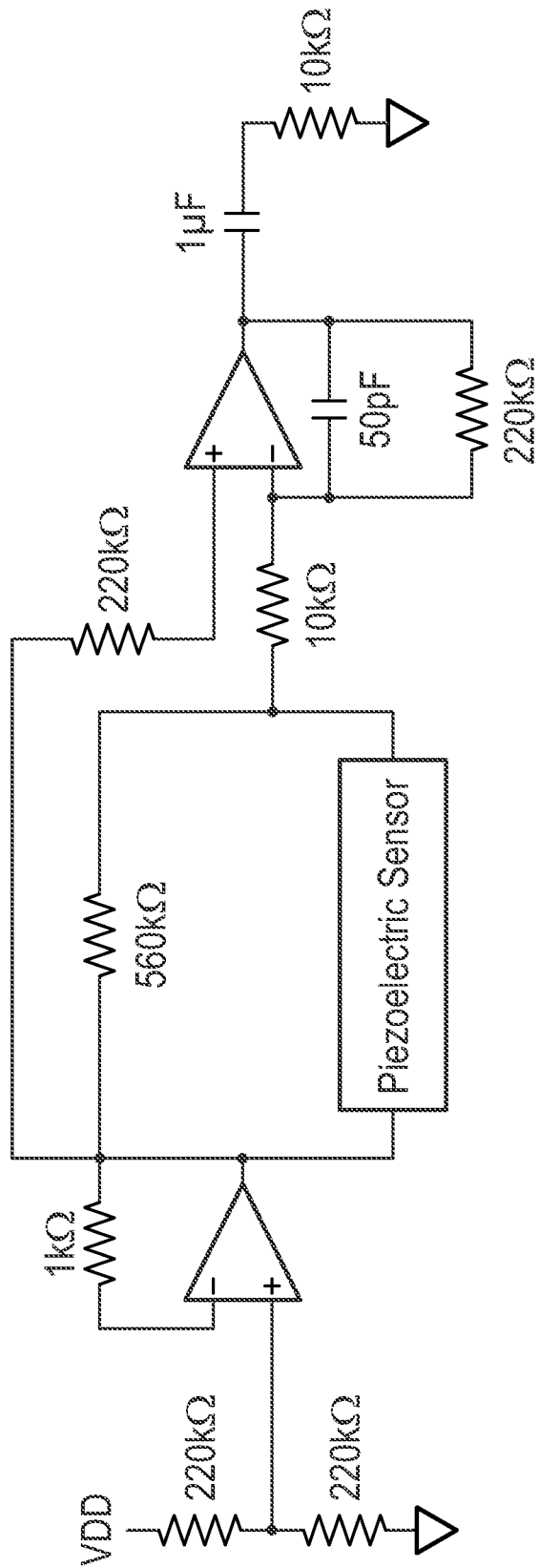
FIG. 4 shows an example schematic of a preamplifier circuit.

An acrylic panel of dimensions 8"×10"×1 mm was supported at its corners by small blocks of wood that measure 1 cm cubed. Acrylic was chosen for this example implementation because of its low Young's modulus, causing it to have many resonant frequencies in the excitation bandwidth. A Dayton Audio® 5 W coin-type exciter is placed in the lower-right corner near the wooden support, and the 2" disc piezo sensor is placed in the upper left corner also near one of the wooden supports. The exciter is connected to a function generator that outputs a 2 VPP 143 Hz sawtooth wave signal, stepped down to approximately 4 mVPP through the use of a voltage divider circuit, then amplified using a PAM8301 0.5 W class-D amplifier in order to drive the exciter. The 143 Hz frequency was chosen arbitrarily. A block diagram of the setup is given in FIG. 2. The general principle of the sawtooth wave driving the exciter and the detected signal from the exciter changing relative to where pressure is applied is illustrated in FIG. 3.

The piezoelectric sensor is connected to a preamplifier circuit made on a protoboard that provides a gain of approximately 28 dB. The schematic is shown below. The preamp feeds into an audio-bandwidth ADC so that data is collected in audio editing software.

Figure 5:
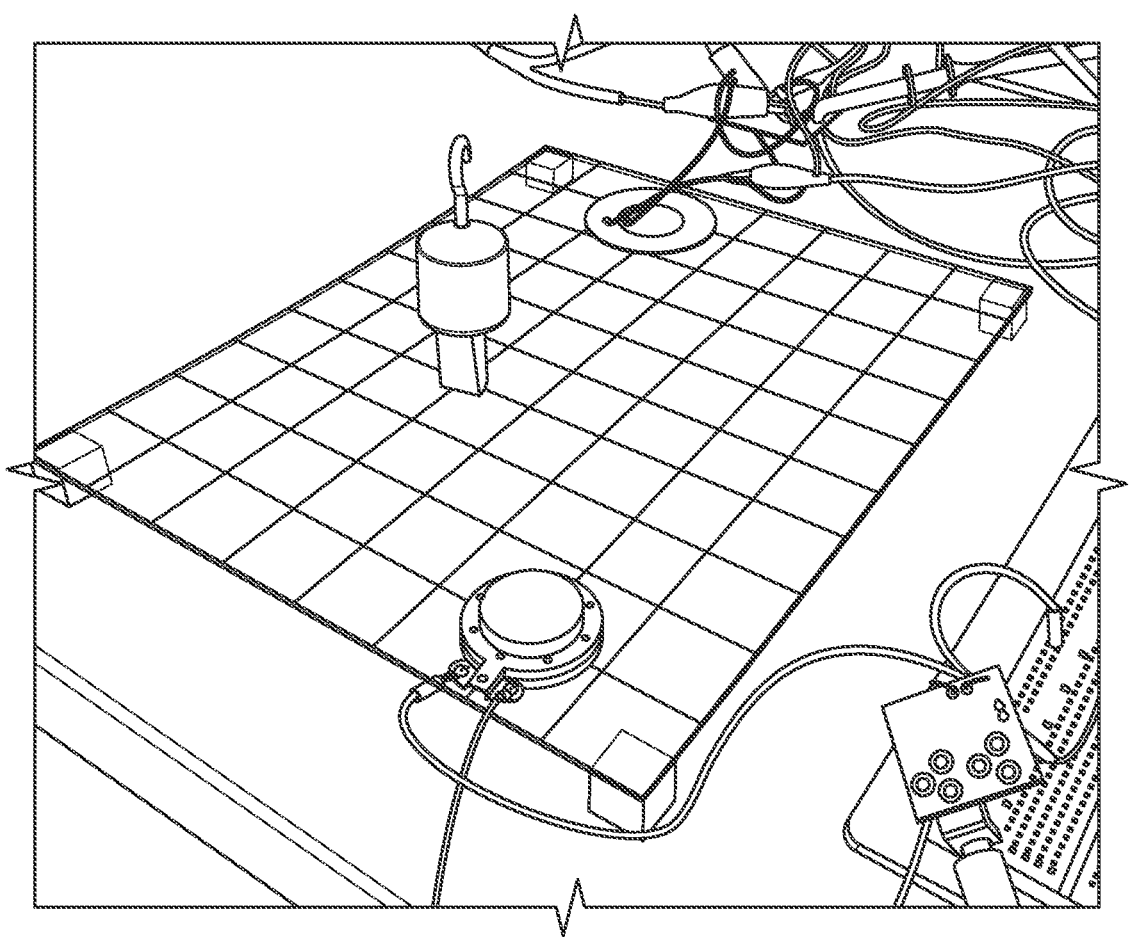
FIG. 5 shows a photo of an example implementation setup.

Rather than collecting training data using an actual finger pressing on the example implementation panel setup, an eraser topped with a weight was used. The setup, including the acrylic panel, exciter, sensor, and weight on top of the eraser for training, is shown in FIG. 5.

Figure 6A:
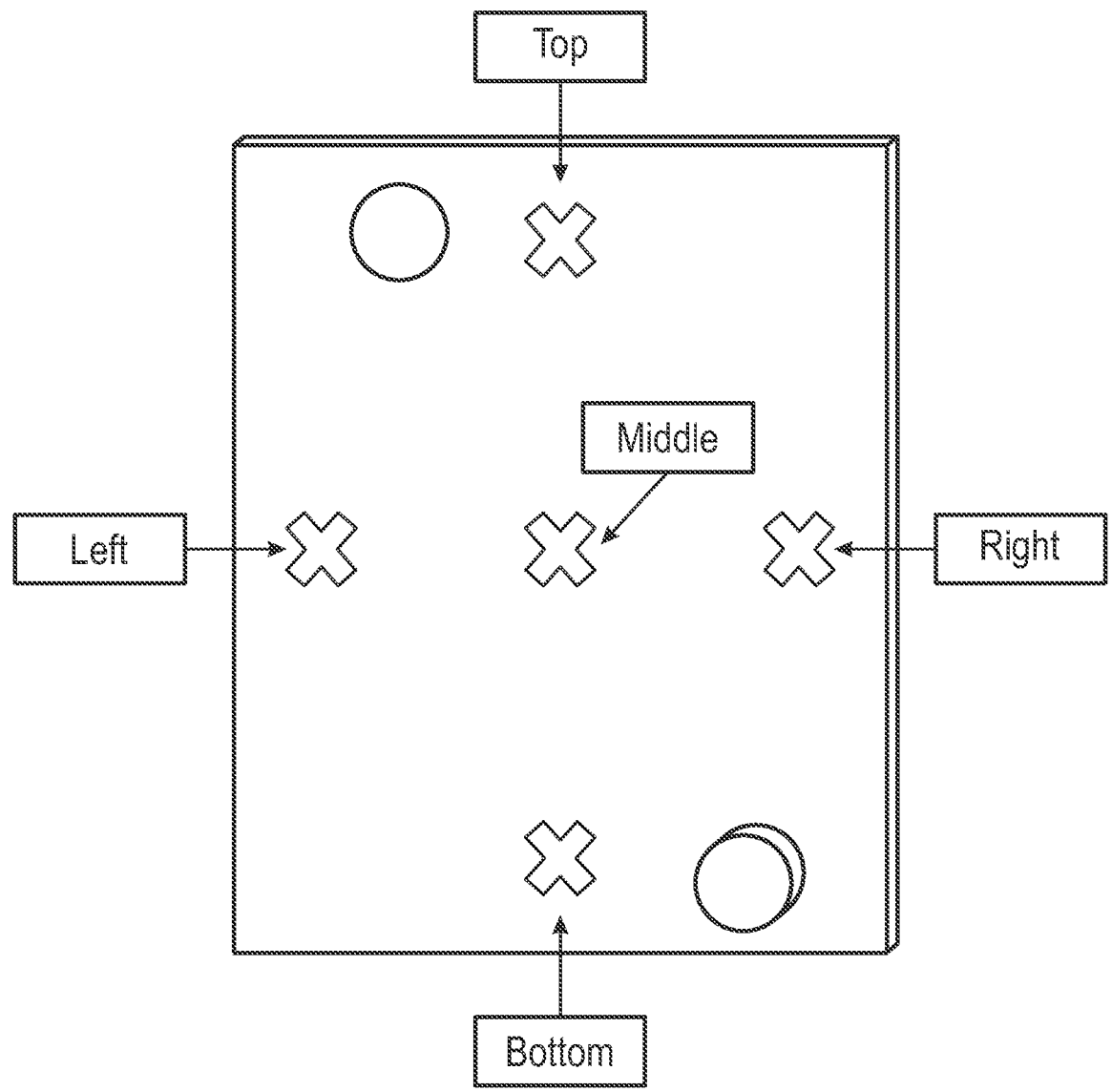
FIGS. 6A and 6B show an illustration of an example test point setup in example implementation 1.
Figure 6B:
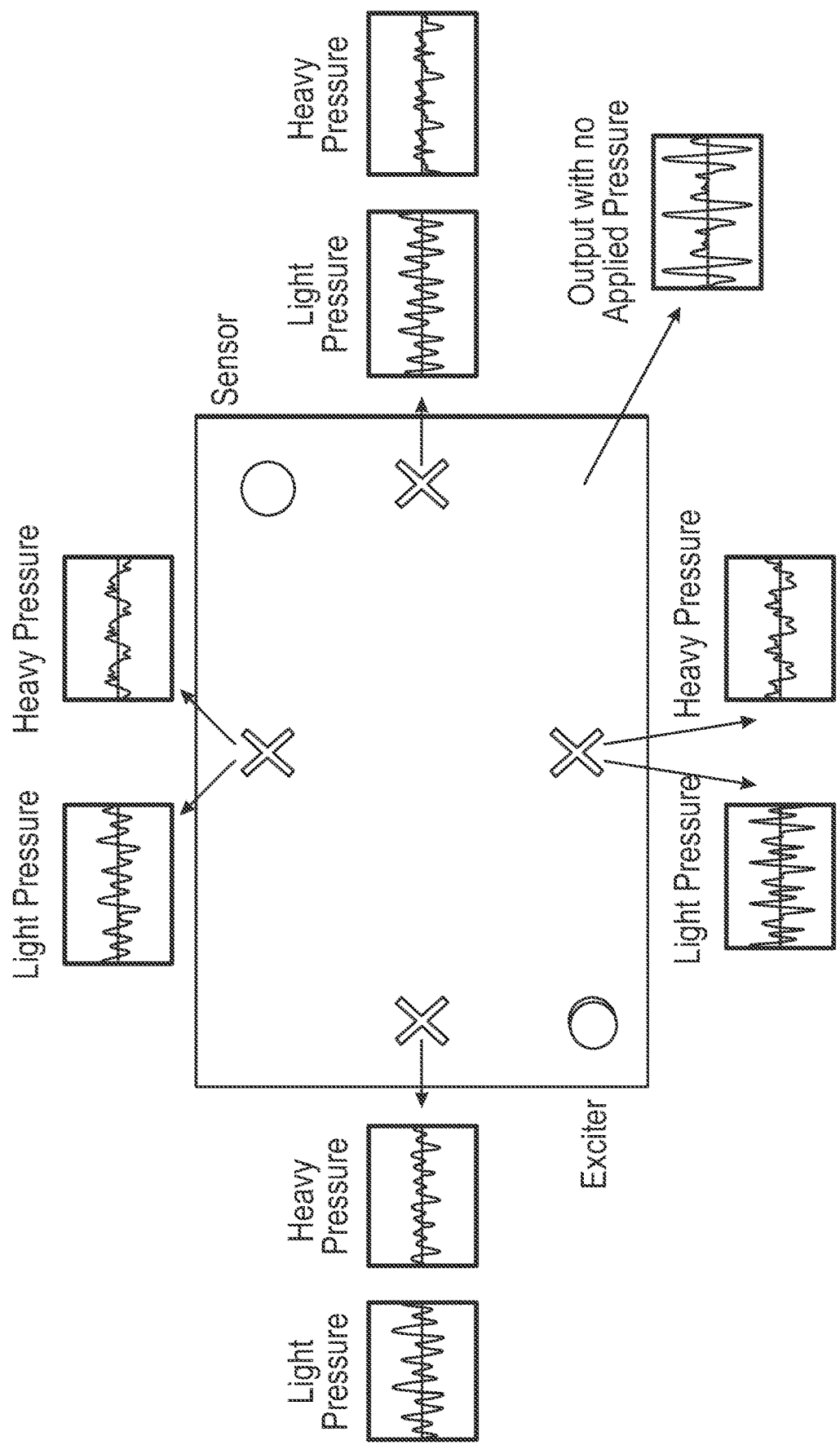

For the first set of training data, 5 points were marked on the panel (left, right, top, bottom, middle) where the eraser and weight were placed, and training data on a "no pressure" condition were also collected. The image in FIG. 6A illustrates the 5 training locations; FIG. 6B shows four of the training locations. Two different weights were used at each location: 50 g and 100 g. The example implementation shows that a trained network can distinguish between different locations and different weights.

Figure 7:
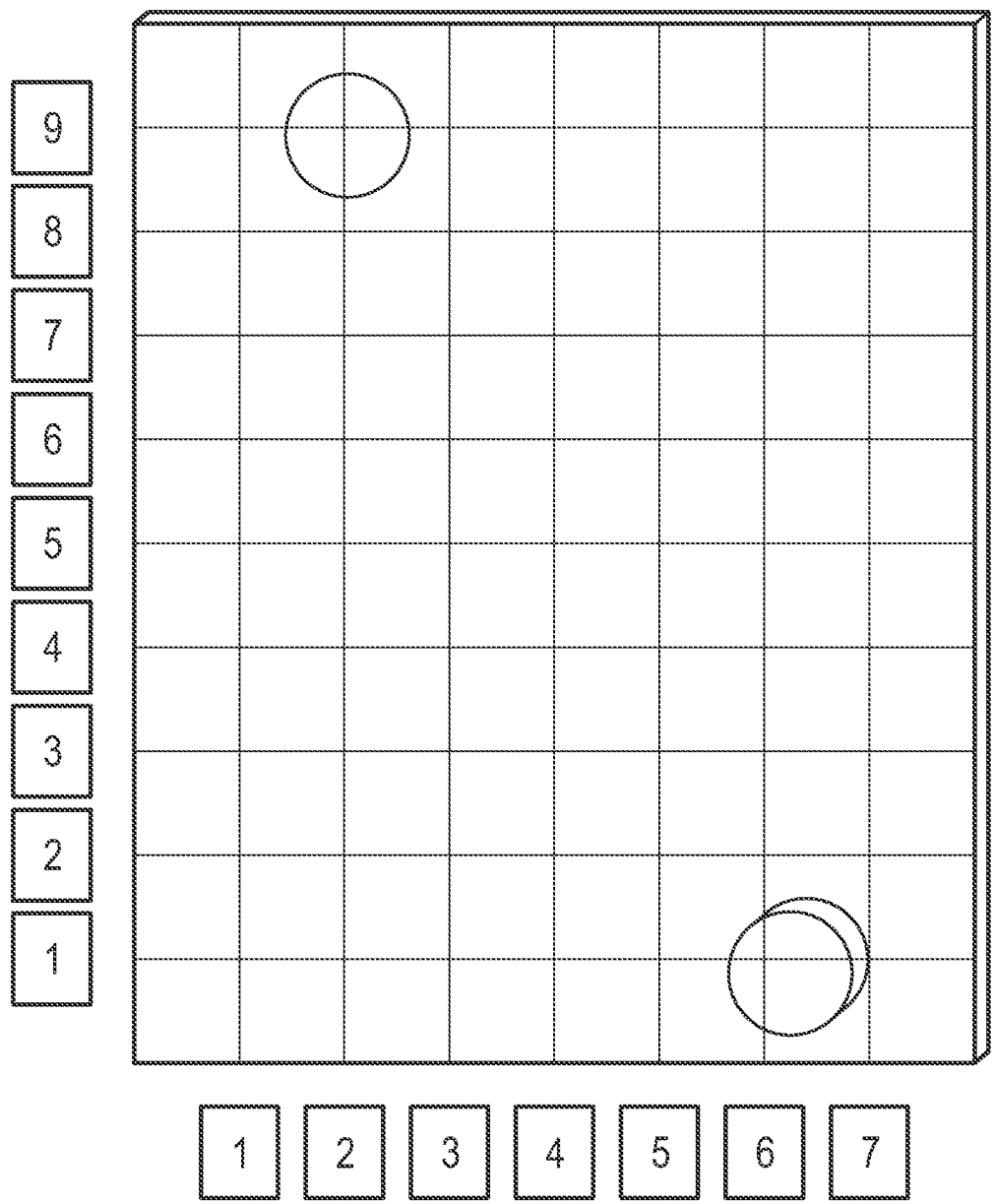
FIG. 7 shows an illustration of an example test point setup in example implementation 2, where the plate is divided into 7 vertical columns and 9 horizontal rows for data collection.

The second set of training data divides the surface of the plate into 63 locations placed on gridlines an inch apart, as illustrated in FIG. 7. Some of the locations were covered by the exciter and sensor and data is not taken at those locations. For this set of training data, only the 100 g weight was used.

Data points are collected in 30-point sets, where the weight is left on each spot for approximately 5 minutes and the 30 points are collected over that duration. Data is collected in MATLAB and each data point corresponds to a 512-point dataset collected at a sampling rate of 8 kHz. The time-dependent data is transformed into the frequency domain via an FFT and the amplitude of the 27 harmonics of the 143 Hz signal—having been distorted by the panel and any applied pressure—are then stored as features for the classification algorithm.

Results and Analysis

The data for each example implementation is classified using a 5-NN model with a 70/30 ratio for training data and validation data. Example implementation 1 used 90 data points for each location and weight, and Example implementation 2 used 60 data points for each location. The training and validation data were selected randomly from the overall data set.

Figure 8:
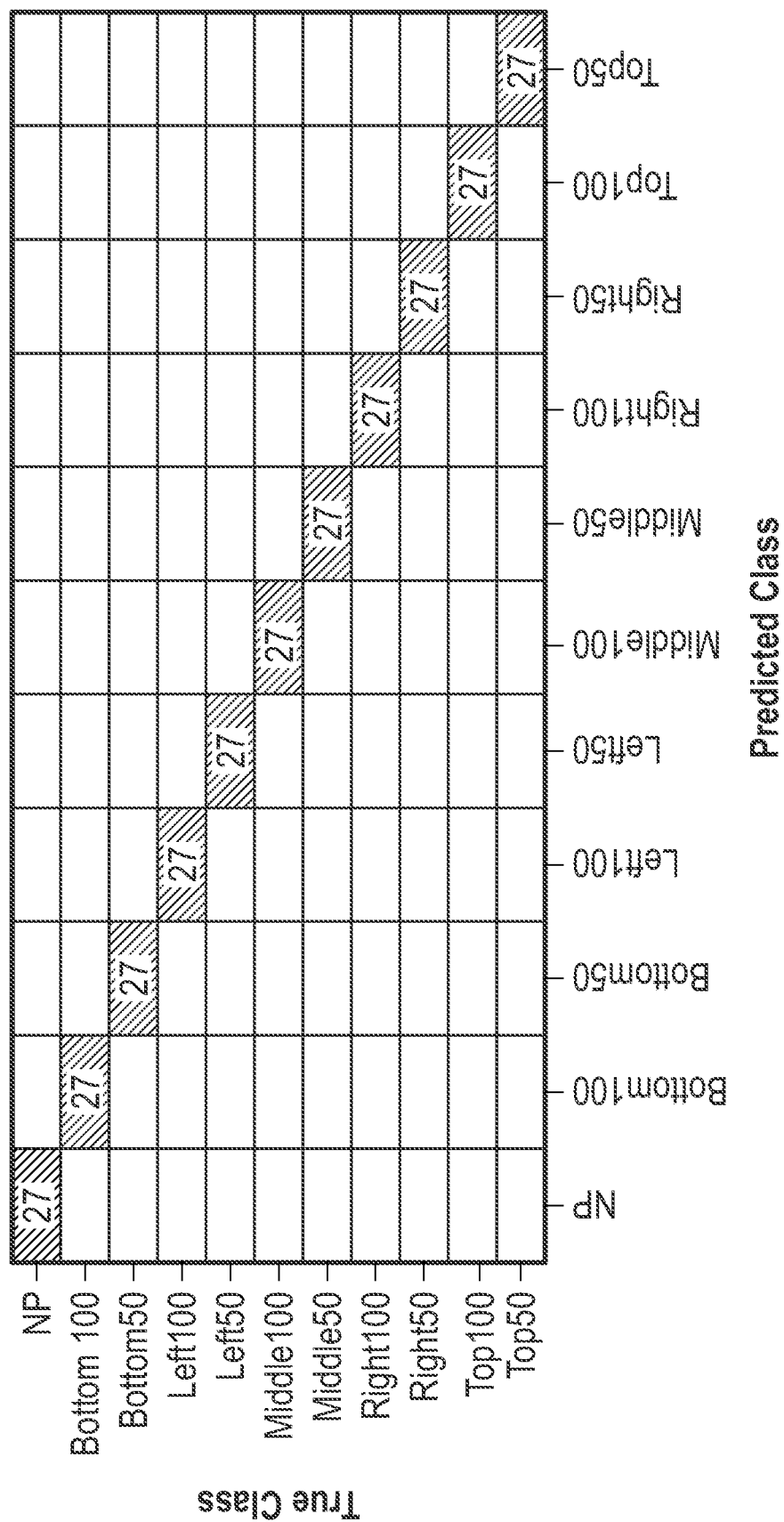
FIG. 8 shows an example confusion matrix for validation data in example implementation 1. The label "NP" means "No Pressure" and the other classes are labeled with "location weight."

The confusion matrix for the validation data in example implementation 1 is shown in FIG. 8; as can be seen, there are no errors in classifying the data.

Figure 9:
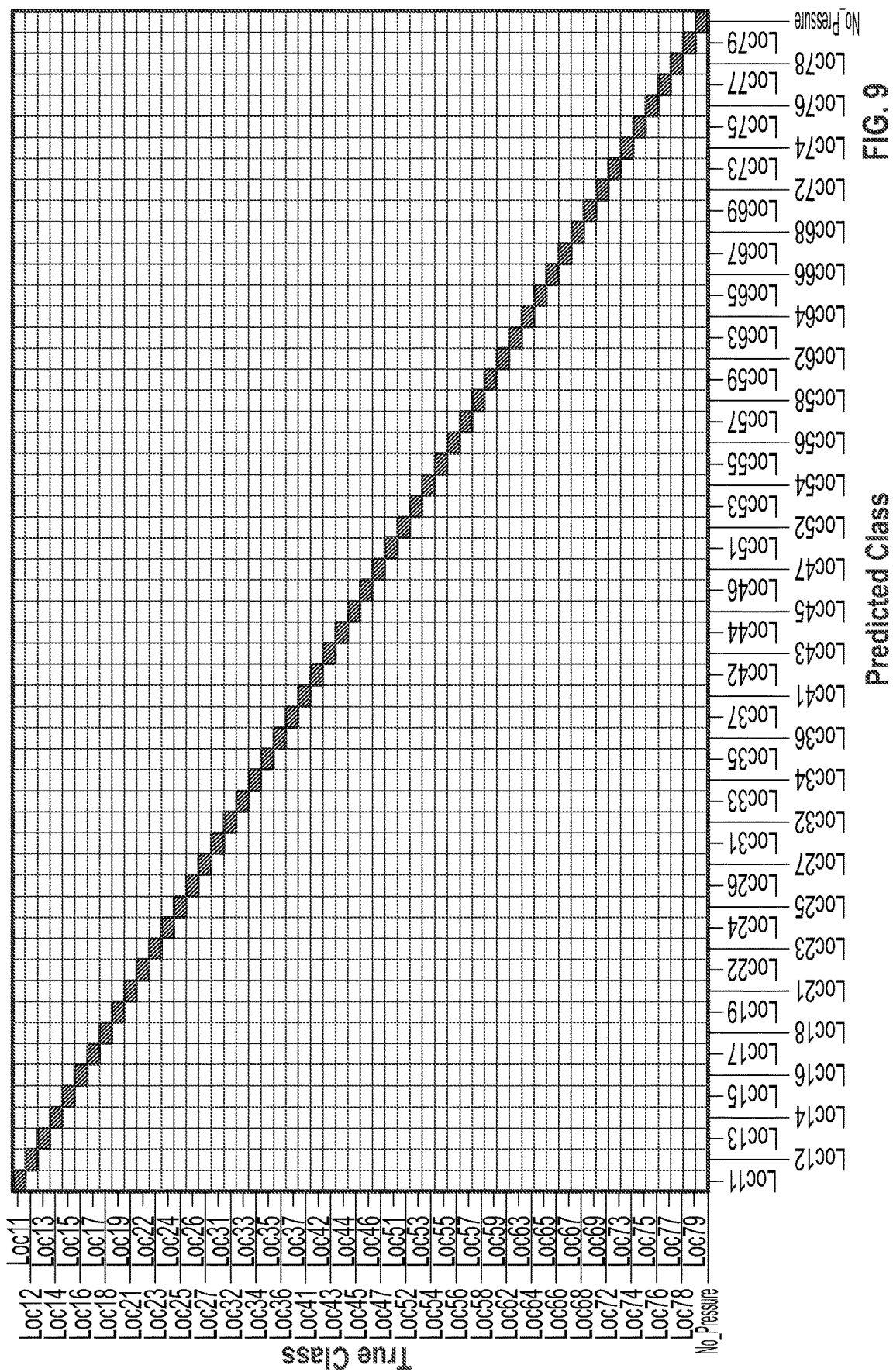
FIG. 9 shows an example confusion matrix for validation data in example implementation 2.

The confusion matrix for the validation data in example implementation 2 is shown in FIG. 9. There are only three errors: a "no pressure" point incorrectly classified as "location (2,6)," a "location (7,7)" point misclassified as a "location (5,7)" point, and a "location (5,2)" point misclassified as a "location (6,2)" point. Fortunately, these points are incorrectly classified as locations that are relatively nearby on the panel.

Example 16—Example Computing System

Figure 10:
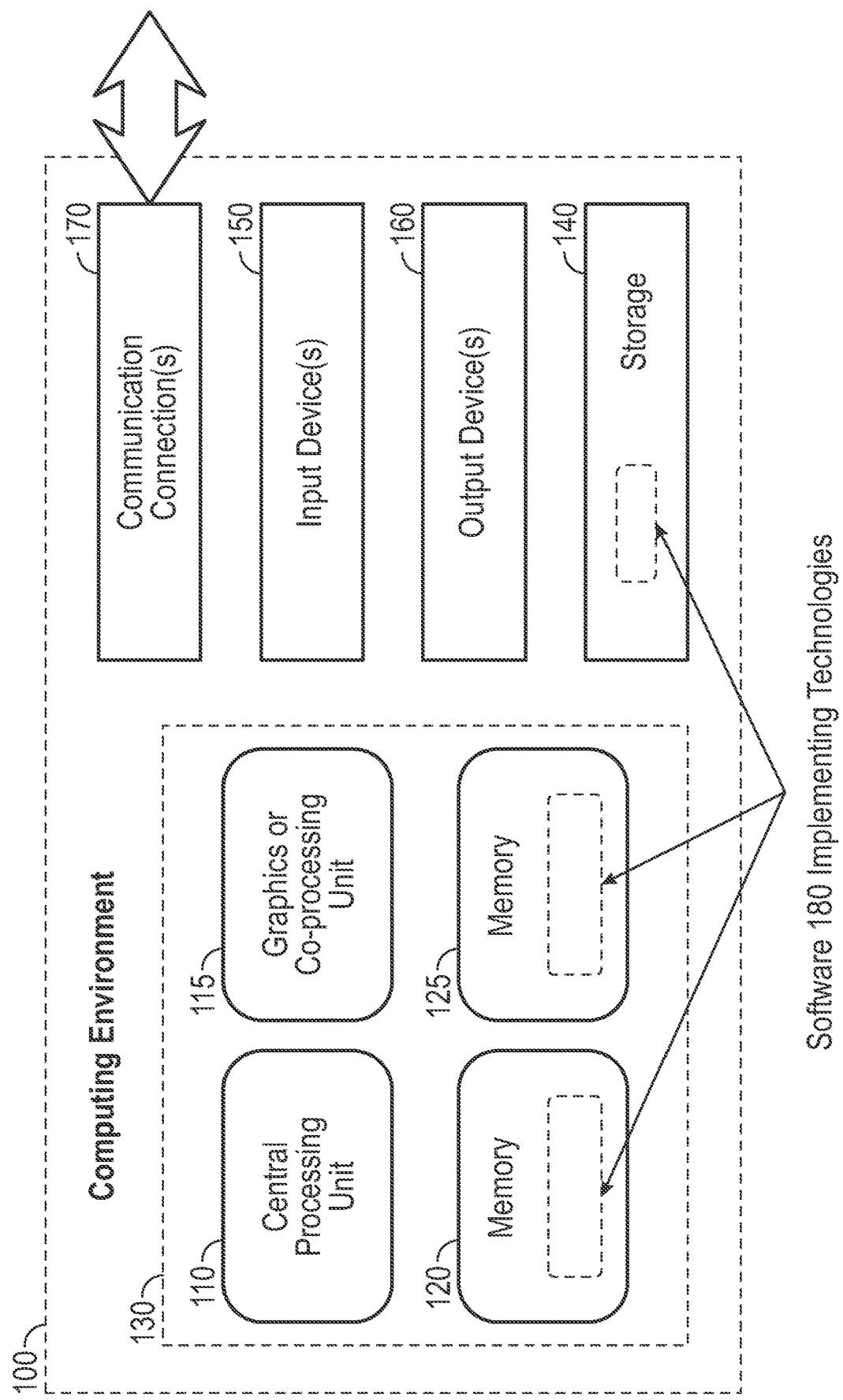
FIG. 10 is a diagram of an example computing system in which described embodiments can be implemented.

FIG. 10 illustrates a generalized example of a suitable computing system 100 in which any of the described technologies may be implemented. The computing system 100 is not intended to suggest any limitation as to scope of use or functionality, as the innovations may be implemented in diverse computing systems, including special-purpose computing systems. In practice, a computing system can comprise multiple networked instances of the illustrated computing system.

With reference to FIG. 10, the computing system 100 includes one or more processing units 110, 115 and memory 120, 125. In FIG. 10, this basic configuration 130 is included within a dashed line. The processing units 110, 115 execute computer-executable instructions. A processing unit can be a central processing unit (CPU), processor in an application-specific integrated circuit (ASIC), or any other type of processor. In a multi-processing system, multiple processing units execute computer-executable instructions to increase processing power. For example, FIG. 10 shows a central processing unit 110 as well as a graphics processing unit or co-processing unit 115. The tangible memory 120, 125 may be volatile memory (e.g., registers, cache, RAM), non-volatile memory (e.g., ROM, EEPROM, flash memory, etc.), or some combination of the two, accessible by the processing unit(s). The memory 120, 125 stores software 180 implementing one or more innovations described herein, in the form of computer-executable instructions suitable for execution by the processing unit(s).

A computing system may have additional features. For example, the computing system 100 includes storage 140, one or more input devices 150, one or more output devices 160, and one or more communication connections 170. An interconnection mechanism (not shown) such as a bus, controller, or network interconnects the components of the computing system 100. Typically, operating system software (not shown) provides an operating environment for other software executing in the computing system 100, and coordinates activities of the components of the computing system 100.

The tangible storage 140 may be removable or non-removable, and includes magnetic disks, magnetic tapes or cassettes, CD-ROMs, DVDs, or any other medium which can be used to store information in a non-transitory way and which can be accessed within the computing system 100. The storage 140 stores instructions for the software 180 implementing one or more innovations described herein.

The input device(s) 150 may be a touch input device such as a keyboard, mouse, pen, or trackball, a voice input device, a scanning device, or another device that provides input to the computing system 100. For video encoding, the input device(s) 150 may be a camera, video card, TV tuner card, or similar device that accepts video input in analog or digital form, or a CD-ROM or CD-RW that reads video samples into the computing system 100. The output device(s) 160 may be a display, printer, speaker, CD-writer, or another device that provides output from the computing system 100.

The communication connection(s) 170 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Example 17—Example Computer-Readable Media

Any of the computer-readable media herein can be non-transitory (e.g., volatile memory such as DRAM or SRAM, nonvolatile memory such as magnetic storage, optical storage, or the like) and/or tangible. Any of the storing actions described herein can be implemented by storing in one or more computer-readable media (e.g., computer-readable storage media or other tangible media). Any of the things (e.g., data created and used during implementation) described as stored can be stored in one or more computer-readable media (e.g., computer-readable storage media or other tangible media). Computer-readable media can be limited to implementations not consisting of a signal.

Example 18—Example Computer-Executable Implementation

Any of the methods described herein can be performed by computer-executable instructions (e.g., causing a computing system to perform the method, capable of causing one or more processor to perform the method, and the like) stored in one or more computer-readable media (e.g., storage or other tangible media) or stored in one or more computer-readable storage devices. Such methods can be performed in software, firmware, hardware, or combinations thereof. Such methods can be performed at least in part by a computing system (e.g., one or more computing devices).

Such acts of the methods described herein can be implemented by computer-executable instructions in (e.g., stored on, encoded on, or the like) one or more computer-readable media (e.g., computer-readable storage media or other tangible media) or one or more computer-readable storage devices (e.g., memory, magnetic storage, optical storage, or the like). Such instructions can cause a computing device to perform the method. The technologies described herein can be implemented in a variety of programming languages.

In any of the technologies described herein, the illustrated actions can be described from alternative perspectives while still implementing the technologies. For example, "receiving" can also be described as "sending" for a different perspective.

Example 19—Example Alternatives

The technologies from any example can be combined with the technologies described in any one or more of the other examples. In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims and their equivalents.

The invention claimed is:

1. A touch-sensing system, comprising:
   at least one surface;
   at least one exciter, wherein the exciter is coupled to the surface for applying a saw tooth excitation waveform to the surface, wherein the saw tooth excitation waveform comprises a low-frequency waveform with even and odd harmonics:
   at least one sensor, wherein the sensor is coupled to the surface, and detects an emission waveform at the surface;
   at least one processor, wherein the at least one processor is coupled to:
      the at least one sensor; and
      memory, wherein the memory comprises computer-executable instructions capable of causing the at least one processor to perform a process comprising:
         receiving a digital representation of the emission waveform as detected by the at least one sensor;
         determining the presence of a touch, location of a touch, or the amount of pressure of a touch at the surface based on the digital representation of the emission waveform, wherein the determining comprises classifying the emission waveform based on one or more of magnitudes or phases of even and odd harmonics extracted from the emission waveform using a classifier trained using machine learning; and
         outputting the presence of a touch, location of a touch, or the amount of pressure of a touch at the surface.

2. The touch-sensing system of claim 1, wherein:
   the at least one exciter is a single exciter; and
   the at least one sensor s a single sensor.

3. The touch-sensing system of claim 1, wherein:
the machine learning comprises artificial neural network; and
training the classifier comprises:
receiving:
an emission waveform associated with the surface without the presence of a touch; and
a plurality of emission waveforms each associated with the presence of a touch, location of a touch, or the amount of pressure of a touch at the surface;
extracting one or more of magnitudes or phases of even and odd harmonics from the emission waveforms each associated with the presence of a touch, location of a touch, or the amount of pressure of a touch at the surface;
identifying a classifier model based on the one or more of magnitudes or phases of the even and odd harmonics extracted from the emission waveforms each associated with the presence of a touch, location of a touch, or the amount of pressure of a touch at the surface; and
outputting a trained classifier.

4. The touch-sensing system of claim 1, wherein:
the classifier comprises a nearest neighbor classifier (K);
the location of a touch is represented by position coordinates at the surface; or
the saw tooth excitation waveform comprises a frequency ranging from 100-200 Hz.

5. The touch-sensing, system of claim 4, wherein a value of K is in an odd number in a range of 3 to 7 nearest neighbors.

6. The touch-sensing system of claim 5, wherein the value of K is 5 nearest neighbors.

7. The touch-sensing system of claim 4, wherein the nearest neighbor classifier (K) is machine learning-trained based on a ratio of 70/30 training data to validation data.

8. A method for sensing touch at a surface, comprising:
applying an excitation waveform to a surface by at least one exciter;
detecting an emission waveform at the surface by at least one sensor;
extracting one or more of magnitudes or phases of even and odd harmonics from the emission waveform;
determining the presence of a touch, location of a touch, or the amount of pressure of a touch at the surface based on the one or more of magnitudes or phases of the even and odd harmonics extracted from the emission waveform; and
outputting the presence of a touch, location of a touch, or the amount of pressure of a touch at the surface.

9. The method of claim 8, wherein:
the excitation waveform comprises a low-frequency waveform with even and odd harmonics; and
the determining the presence of a touch at the surface comprises:
receiving the emission waveform from the sensor; and
classifying the emission waveform using the one or more of magnitudes or phases of the even and odd harmonics using a classifier trained using machine learning.

10. The method of claim 9, wherein:
the machine learning comprises artificial neural network; and
training the classifier comprises:
receiving:
an emission waveform associated with e surface without the presence of a touch; and
a plurality of emission waveforms each associated with the presence of a touch, location of a touch, or the amount of pressure of a touch on the surface;
extracting one or more of magnitudes or phases of even and odd harmonics from the emission waveforms each associated with the presence of a touch, location of a touch, or the amount of pressure of a touch at the surface;
identifying a classifier model based on the one or more of magnitudes or phases of the even and odd harmonics extracted from the emission waveforms each associated with the presence of a touch, location of a touch, or the amount of pressure of a touch at the surface; and
outputting a trained classifier.

11. The method of claim 9, wherein:
the classifier comprises a nearest neighbor classifier (K);
the location of a touch is represented by position coordinates at the surface; or
the excitation waveform comprises a frequency ranging from 100-200 Hz.

12. The method of claim 8, wherein the applying an excitation waveform comprises applying a saw tooth waveform.

13. The method of claim 11, wherein a value of K is in an odd number in a range of 3 to 7 nearest neighbors.

14. The method of claim 13, wherein the value of K is 5 nearest neighbors.

15. The method of claim 11, wherein the nearest neighbor classifier (K) is machine learning-trained based on a ratio of 70/30 training data to validation data.

16. The method of claim 8, wherein:
the applying an excitation waveform comprises using a single exciter; and
the detecting an emission waveform comprises using a single sensor.

17. A device for sensing touch at a surface, comprising:
at least one surface;
at least one exciter, wherein the exciter is coupled to the surface, and applies an excitation waveform to the surface;
at least one sensor, wherein the sensor is coupled to the surface, and detects an emission waveform at the surface;
at least one computer-readable media storing at least one trained classifier and one or more even and odd harmonics data sets extracted from a plurality of emission waveforms each associated with the presence of a touch, location of a touch, or an amount of pressure of a touch at the surface; and
a touch identifier, configured to:
receive information for an emission waveform from the at least one sensor;
extract even and odd harmonics data from the emission waveform;
determine the presence of a touch, location of a touch, or the amount of pressure of a touch at the surface based on even and odd harmonics data extracted from the emission waveform; and
output whether a touch is present, the location of a touch, or the amount of pressure of a touch at the surface.

18. The device for sensing touch at a surface of claim 17, wherein the determination of the presence of a touch, location of a touch, or the amount of pressure of a touch at the surface based on even and odd harmonics extracted from the emission waveform comprises extraction of one or more of magnitudes or phases of the even and odd harmonics.

19. The device for sensing touch at a surface of claim 17, wherein the excitation waveform comprises a frequency ranging from 100-200 Hz.

20. The device for sensing touch at a surface of claim 17, wherein the excitation waveform comprises a saw tooth waveform.

* * * * *

UNITED STATES PATENT AND TRADEMARK OFFICE
CERTIFICATE OF CORRECTION

| | |
|---|---|
| PATENT NO. | : 11,836,319 B2 |
| APPLICATION NO. | : 17/631805 |
| DATED | : December 5, 2023 |
| INVENTOR(S) | : Anderson |

It is certified that error appears in the above-identified patent and that said Letters Patent is hereby corrected as shown below:

In the Claims

Column 18, Line 67, "the at least one sensor s a single sensor" should read -- the at least one sensor is a single sensor --.

Column 19, Line 66, "an emission waveform associated with e surface" should read -- an emission waveform associated with the surface --.

Signed and Sealed this
Twenty-first Day of May, 2024

Katherine Kelly Vidal
*Director of the United States Patent and Trademark Office*